Nov. 2, 1965    G. D. KNEIP, JR., ET AL    3,215,569
METHOD FOR INCREASING THE CRITICAL
CURRENT OF SUPERCONDUCTING ALLOYS
Filed Feb. 9, 1962    5 Sheets-Sheet 1

INVENTORS.
George D. Kneip, Jr.
Jesse O. Betterton, Jr.
BY Dewey S. Easton
James O. Scarbrough

ATTORNEY.

United States Patent Office 3,215,569
Patented Nov. 2, 1965

3,215,569
METHOD FOR INCREASING THE CRITICAL CURRENT OF SUPERCONDUCTING ALLOYS
George D. Kneip, Jr. and Jesse O. Betterton, Jr., Oak Ridge, and Dewey S. Easton and James O. Scarbrough, Lenoir City, Tenn., assignors to the United States of America as represented by the United States Atomic Energy Commission
Filed Feb. 9, 1962, Ser. No. 172,356
16 Claims. (Cl. 148—133)

The present invention relates to a method for increasing the critical current density of superconducting alloys.

A superconducting metal or alloy is one which loses all detectable resistance to the flow of electrical current below a characteristic critical temperature, current and magnetic field. A parameter used to measure the superconducting capacity of a metal or alloy is the critical current.

The high current-carrying capacity of superconducting materials can be utilized to produce magnetic fields wherever electromagnets can be operated at low temperatures. Similarly, this capacity can be utilized whenever power transmission lines can be operated at low temperatures. The advantage of increasing the critical current, and hence the current-carrying capacity, of a superconducting material is that the volume of the apparatus needed to achieve a selected critical current density is considerably reduced.

It is an object of this invention to provide a method for increasing the current-carrying capacity of a superconducting alloy under superconducting conditions. Another object of this invention is to provide an improved superconducting alloy composition whose current-carrying capacity below its critical temperature and magnetic field has been significantly increased. Another object is to provide an improved superconducting solenoid. Another object is to produce such improved superconducting alloy by the method to be described. Other objects and advantages will become apparent from the ensuing description.

Stated in its broad terms, the method of this invention comprises annealing a selected superconduction alloy, whose structure consists essentially of a single homogeneous solid solution phase, at a temperature at which an equilibrium phase will develop, as indicated by an equilibrium phase diagram of said alloy, for a sufficient time to affect precipitation of a secondary phase within the volume of the matrix homogeneous solid solution. As used herein, the process of precipitation refers to the generation of a secondary phase other than the initial homogeneous solid solution phase of the treated alloy. This secondary phase will be understood to include the product resulting from the rearrangement (frequently termed "ordering and/or clustering") of the constituent atoms of the homogeneous solid solution when it is heat-treated, i.e., annealed in the multiphase region of the alloy, as shown by its equilibrium phase diagram. The secondary phase will comprise, in the main, precipitated particles whose composition and/or size may vary with time at the selected annealing temperature. In another situation said phase may be particles whose composition will be invariant with time but whose size may vary with time at the selected annealing temperature. These latter particles correspond to the equilibrium composition at the selected precipitating temperature. In still another situation, the secondary phase may comprise a mixture of the two aforesaid phases.

The selected alloys to which this invention can be applied with particular advantage are those known as "hard" superconductors and designate a class of superconducting alloys whose superconductivity is destroyed gradually upon reaching its characteristic critical magnetic field, as contrasted with a "soft" superconductor which is restored to its normal resistance state rather abruptly upon reaching its critical magnetic field. The selected superconducting alloy systems are further characterized in that their equilibrium phase diagrams show the existence of a single or essentially homogeneous solid solution at a relatively high temperature at least of the order of 500° C. and which at a lower or higher temperature at the same composition shows a multiphase region. Alloys of the defined class to which the method of this invention is applicable are formed from metals of Groups IVA, VA, and VIA and elements of Groups III, IV, V, VI, VII and VIII of the Periodic Table, as it appears in the 1956 edition of "Webster's New Collegiate Dictionary." Specific examples of some superconducting alloys whose current-carrying capacity at superconducting temperatures may be increased by the method of this invention include, among others, alloys of zirconium and niobium, titanium and chromium, titanium and molybdenum, uranium and molybdenum, uranium and vanadium, zirconium and molybdenum, titanium and molybdenum, niobium and uranium, and titanium and zirconium. All of such alloys are "hard" superconductors which show the formation of a secondary or multiphase precipitate above or below an essentially uniform and homogeneous solid solution of the alloy components as shown by equilibrium phase diagrams of their respective alloy systems. The precipitating temperature necessary to form the improved superconducting state may be approached from a higher temperature where the alloy components are in solution or from a lower temperature such as a cold casting of the alloy which is brought from room temperature to the range of temperature where the precipitated phase is formed. In either case, the heat treatment or annealing temperature is reached and maintained for a relatively short time, generally less than about 48 hours, to allow the formation of a finely-divided secondary phase dispersed within the volume of the solid solution matrix. After the annealing operation, the annealed alloy is rapidly cooled, i.e., quenched to room temperature in order to retain the desired precipitated phase. The superconducting critical current of the heat-treated alloy will be found to have been appreciably increased, in many cases, by at least an order of magnitude in comparison to an untreated alloy.

The exact mechanism responsible for effecting the remarkable increase in the critical current of superconducting alloys treated in the aforementioned manner is not clearly understood. However, on the basis of magnetic susceptibility measurements on alloys, it is generally agreed that only a small portion of the alloy carries the superconducting current. This suggests that the precipitation of a secondary phase by the annealing operation, affects the observed increase in critical current by introducing a strain and/or defect in the superconducting alloy with the resulting inhomogeneities in the superconductor serving to increase the number of, and/or stabilize the existing small regions of superconductivity.

It should be noted here that the critical current of superconducting alloys can be increased by cold-working. However, even in cases where the annealing treatments described herein are applied to superconducting alloys which have had a history of cold-working prior to and/or after the designated annealing teratment, the superconducting properties of such cold-worked alloys will be found to have improved.

Having described the method of our invention in general terms, together with the selected class of superconducting alloys in which the method may be most advantageously applied, we will now describe a specific embodiment in detail in connection with the accompanying drawings in which:

FIG. 1 is a schematic diagram of the system used to measure the critical current, i.e., current-carrying capacity of the superconducting alloy specimens.

FIG. 2 shows the pertinent portion of the phase diagram for the niobium-zirconium alloy system used as the specific embodiment to illustrate the method of the invention. It will be noted from the phase diagram of FIG. 2 that at 500° C. the retained high temperature phase dissociates into a hexagonal close-packed, zirconium-rich, solid-solution phase and a body-centered, niobium-rich, solid-solution phase; while at 800° C. the phases are two body-centered cubic phases, one enriched in zirconium and the other enriched in niobium.

Figure 3:
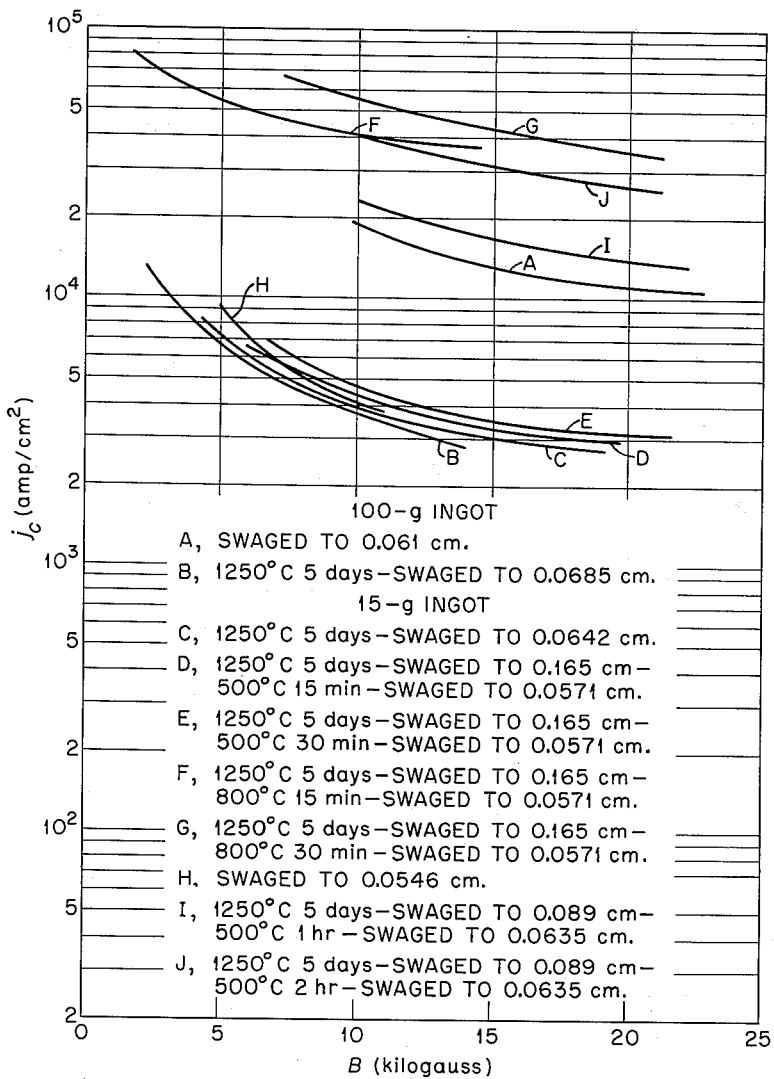
FIG. 3 is a plot showing the variation of critical current density as a function of magnetic field strength for a number of heat treatments of a niobium-base alloy containing 33 atomic weight percent zirconium. Also shown in the variation in critical current density as a function of its metallurgical history as designated by the captions included in the figure.
Figure 4:
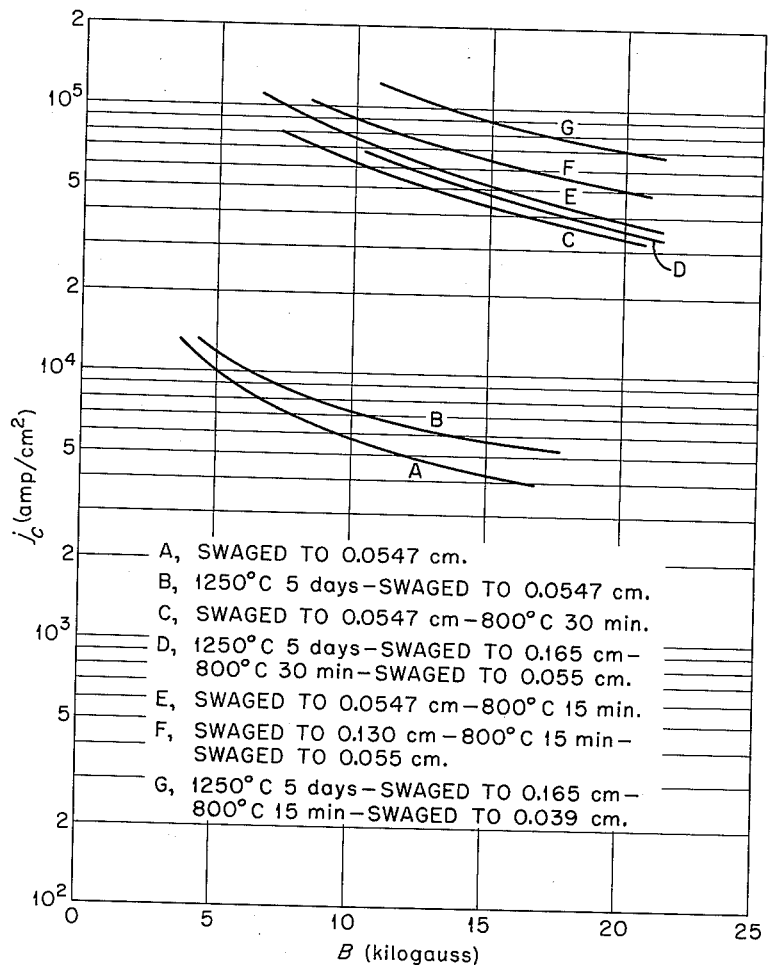
FIG. 4 is a similar plot for a niobium-base alloy containing 28 percent zirconium.

The specific superconducting alloys in which we illustrate the profound improvement in the current-carrying capacity resulting from the method of this invention are niobium-zirconium alloys having a composition of 28 atomic weight percent of zirconium in one case (FIG. 3) and 33 atomic weight percent zirconium in another (FIG. 4).

*Example*

Niobium-base alloys of 28 and 33% zirconium (atomic percent) were prepared from electron-beam melted niobium and iodide zirconium. A 100-gram ingot of the 33% zirconium alloy was prepared in the form of a long cylinder. One-half of the ingot was cold-swaged to effect a 99% reduction in area to form a 0.061 cm. wire (curve A of FIG. 3) and the other half was annealed at 1250° C. for 5 days in an argon filled quartz capsule to homogenize the alloy and then cold-swaged to a wire 0.0685 cm. in diameter (curve B of FIG. 3). In another experiment a series of 15-gram ingots were prepared in the same manner; each of the 15-gram ingots was divided in half. One-half of each ingot was cold-swaged to effect an approximately 99% reduction in area to form a wire 0.0546 cm. in diameter (curve H of FIG. 3) and the other half was annealed for 5 days and further processed according to the schedules shown in captions C through G of FIG. 3. The critical current of the various wire specimens was then measured at 4.2° K. as a function of magnetic field up to about 23 kilogauss in an iron-core magnet with superconducting coils in the system shown in FIG. 1.

Figure 1:
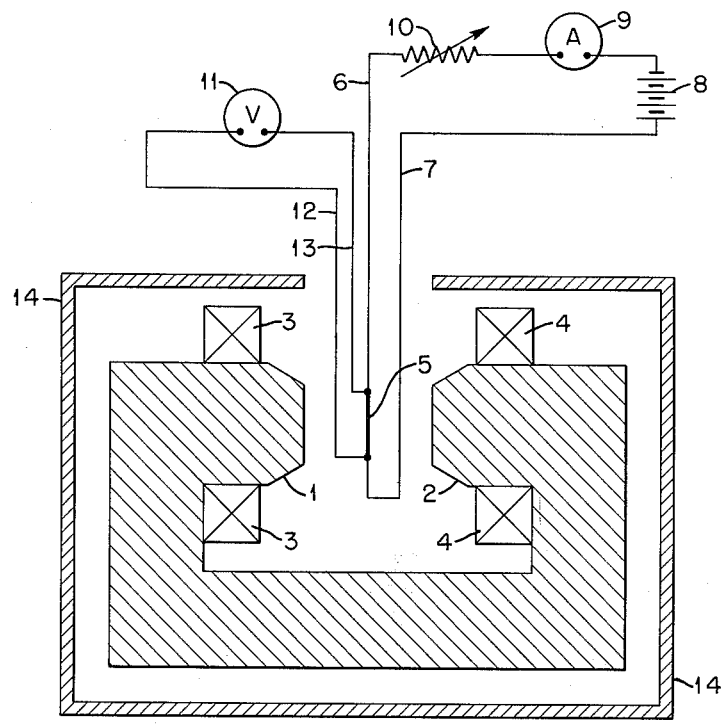
Figure 2:
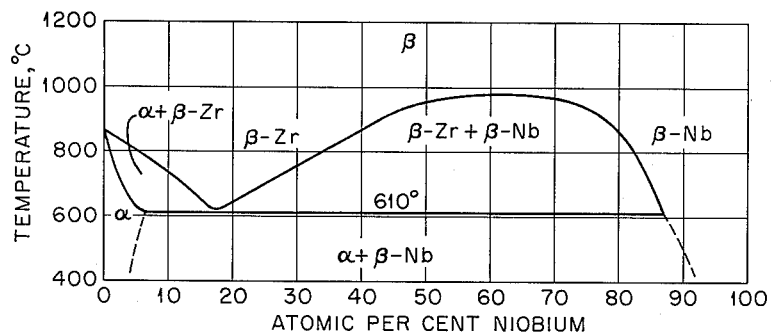

Referring to FIG. 1, a magnetic field of up to about 25 kilogauss was established between the pole pieces 1 and 2 of a magnet wound with superconducting coils 3 and 4. A wire sample 5 (those wires treated as previously described and in connection with schedules A through H of FIG. 3 and schedules A through F of FIG. 4) was oriented transverse to the magnetic field midway between the pole pieces. Current was supplied to the sample through leads 6 and 7 from a current source 8. This current was measured with ammeter 9 inserted in line 6 in series with a current adjusting resistor 10. The voltage across the sample was measured with a voltmeter 11 connected to the sample by leads 12 and 13. The magnet and sample were immersed in a liquid helium container 14 to maintain a temperature of 4.2° K. during measurement.

For each alloy specimen data was taken by increasing the current through the sample at a constant magnetic field until a detectable voltage was observed. This indicates a loss of superconductivity in the sample. The current required to produce the lowest detectable voltage divided by the cross sectional area of the test wire specimen was recorded as a function of the applied magnetic field to produce the curves shown in FIGS. 3 and 4.

Referring to curves A and H of FIG. 3 and to the corresponding processing schedules as shown by captions A and H thereof, it will be seen that at an applied magnetic field of 10 kilogauss the current density of the wire formed from the 15-gram ingot (curve H) was approximately $4 \times 10^3$ amp./cm.$^2$, whereas the wire formed from the 100-gram ingot had a current density of slightly less than $2 \times 10^4$ amp./cm.$^2$ (curve A), a five-fold difference in the current-carrying capacity between the two wires.

This marked disparity in the current-carrying capacity between wires A and H seemed surprising since both wires had apparently experienced the same metallurgical history, and the wires had both been formed by cold-swaging an alloy of the same composition, the only difference being that in one case the wire was formed from a 100-gram ingot and in the other from a 15-gram ingot. It was surmised that the difference in result was due to the larger alloy ingot having undergone a slower cooling rate, thus obtaining a metallurgical structure which enhanced its superconducting properties. This interpretation was corroborated by the results shown in curves F and G of FIG. 3. The wires represented by curves B and C were cold-swaged from the two ingots which had been annealed at 1250° C. for five days. As shown, both wires B and C had a critical current density of the same order of magnitude as the wire which had been cold-swaged from the 15-gram ingot (curve H). The differences between curves B and C do not reflect the size of the ingot as in curves A and H because equally fast cooling from 1250° C. to room temperature was done in both cases B and C.

In runs D and E the 15-gram alloy ingots were annealed at 1250° C., cooled to room temperature, swaged to wire size, annealed at 500° C. for 15 minutes in one case and 30 minutes in another, and then cold-swaged to a smaller wire size. The current density curves D and E showed only a slight increase over curve H. This should be contrasted with runs F and G where the 15-gram ingots were homogenized at 1250° C., rapidly cooled, i.e., quenched to room temperature, swaged to wire size, annealed for short periods at 800° C., and quenched to retain the developed metallurgical structure during the short anneal period. The resultant wires showed an increased current density at constant magnetic field applied transverse to said wires by an order of magnitude in comparison to wire represented by captions B, C, D, E, and H. It is thus apparent that the secondary metallurgical phase structure developed during the short 800° C. anneal treatment must contribute in some way to the improved superconducting properties noted. We have also found the improved critical current density in wires treated at this annealing temperature within the $\beta Zr$-$\beta Nb$ phase region which were not subsequently cold-swaged.

The enhanced superconductivity achieved by annealing, quenching to retain the selected secondary phase in the $\beta Zr$-$\beta Nb$ region of the Zr-Nb equilibrium phase diagram and the subsequent cold-working is further illustrated in FIG. 4 for a niobium-base alloy containing 28% zirconium. It will be noted that wherever the secondary phase resulting from annealing in the $\beta Zr$-$\beta Nb$ region was retained as part of the metallurgical structure of the alloy, the current densities were improved by an order of magnitude in comparison to those alloys where such secondary phase was not attained and the only metallurgical treatment was by way of cold-working. Curves C–G of FIG. 4 represent wires in which the secondary phase was achieved by annealing at 800° C. in the βZr-βNb region of the Zr-Nb phase diagram. The resulting enhanced superconductivity can be noted at 15 kilogauss, for example, where the superconducting current densities of wires C–G ranged from slightly above $4 \times 10^4$ to $9 \times 10^4$ amp./cm.$^2$, while cold-worked wires A and B, where the secondary precipitated phase was not produced, exhibited depressed current densities on a comparative basis; wire A of FIG. 4 had a current density of slightly above $4 \times 10^3$ amp./cm.$^2$ and wire B slightly less than $6 \times 10^3$ amp./cm.$^2$. It is clear that an average ten-fold increase in the superconducting current-carrying capacity may me achieved by annealing the alloy at 800° C., in the βZr-βNb region of its phase diagram for periods ranging from 15 to 30 minutes and then quenching the annealed alloy to retain the desired precipitated phase. The maximum current density achievable by the method has been found to be a function of annealing temperature at the selected secondary phase region.

Figure 5:
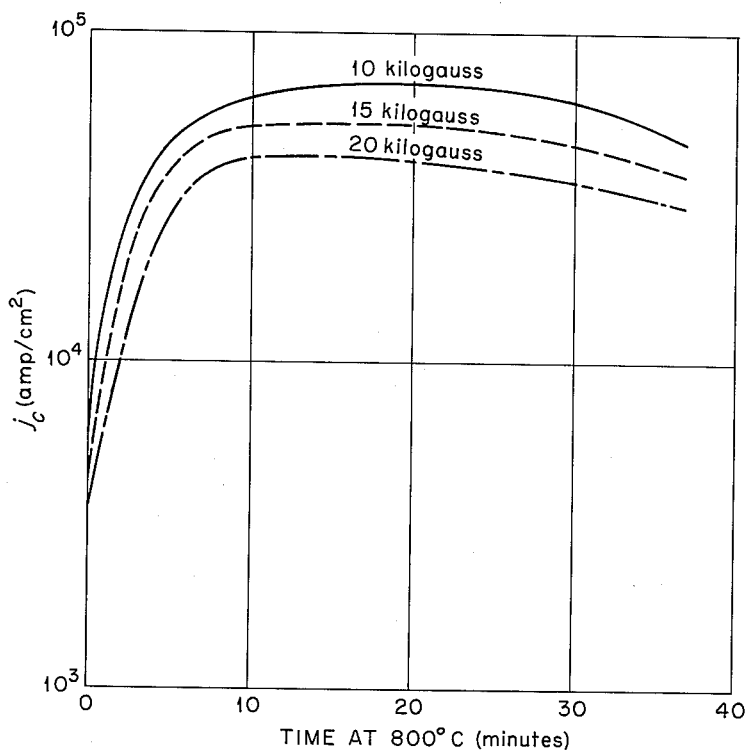
FIG. 5 is a graph illustrating the effect of time at the incipient precipitating temperature upon critical current density.

FIG. 5 illustrates the effect of annealing time on the enhanced current density with the 28% zirconium alloy. The maximum critical current was also found to be a function of annealing time as well as alloy composition. For example, 15–20 minutes was required to achieve maximum current density with the niobium-base alloy containing 28% zirconium, while 30–40 minutes was required to reach maximum current density with the niobium-base alloy containing 33% zirconium. In the case illustrated in FIG. 5 the current density increases rapidly for the first few minutes of annealing time, reaches a maximum at about 20 minutes and then drops off. This form of annealing time-current density curve should not be taken as typical, however. In other alloys, and even within the same alloy system, for example, annealing to induce precipitation of a secondary phase and then rapidly cooling (i.e., quenching) to retain the precipitated structure will show a different critical current-annealing relationship in which the maximum current density is reached after a longer or shorter annealing period. This will depend on the particular secondary phase selected to conduct the desired precipitation and the amount of prior cold reduction within which the annealing-quenching precipitated secondary phase sequence is undertaken to achieve a maximum degree of improvement in the critical current density of the treated alloy specimen.

The improvement in critical current density achieved in βZr-βNb region of the niobium-zirconium phase diagram can also be induced by annealing in the αZr-βNb phase region as well. This is illustrated by a consideration of curves D, E, I, and J of FIG. 3 where the respective wire represented by said curves were all made from niobium 33 atomic percent zirconium alloy bars which were homogenized by heating at 1250° C., cooled rapidly and cold-swaged to a lower gauge, heated at 500° C. for 15 minutes (curve D); 30 minutes at 500° C. (curve E); one hour at 500° C. (curve I); and two hours at 500° C. (curve J). It will be seen that while the current density curves D and E showed only slight improvement over B, C, and H (representing the non-precipitated material), annealing for one hour (curve I) and 2 hours (curve J) at 500° C. resulted in a significantly high increase in critical current density, by a factor greater than about 10 in the case of curve J.

While, as previously noted, we do not claim to understand the mechanism involved in the process of precipitation as we use it to improve the critical current density of superconducting alloys, we can state our observations concerning the physical structure achieved by such precipitation. For example, when the 28% zirconium wire which was annealed at 800° C. but not subsequently cold-worked was examined metallographically, the particles of the secondary phase which had precipitated after the short anneal period of 30 minutes were found to be extremely small in size so that they could not be resolved in the field of a metallographic microscope having a magnification of 1500 times. X-ray diffraction studies showed diffraction lines corresponding to a body-centered cubic lattice with a lattice parameter of 3.36 Angstroms at the retained composition of 28% zirconium. Within the sensitivity of the X-ray diffraction instrument used, no evidence was found for the existence of the equilibrium phases of 66 and 17% zirconium but extra lines appeared in the X-ray diffraction pattern corresponding to a secondary phase.

Figure 6:
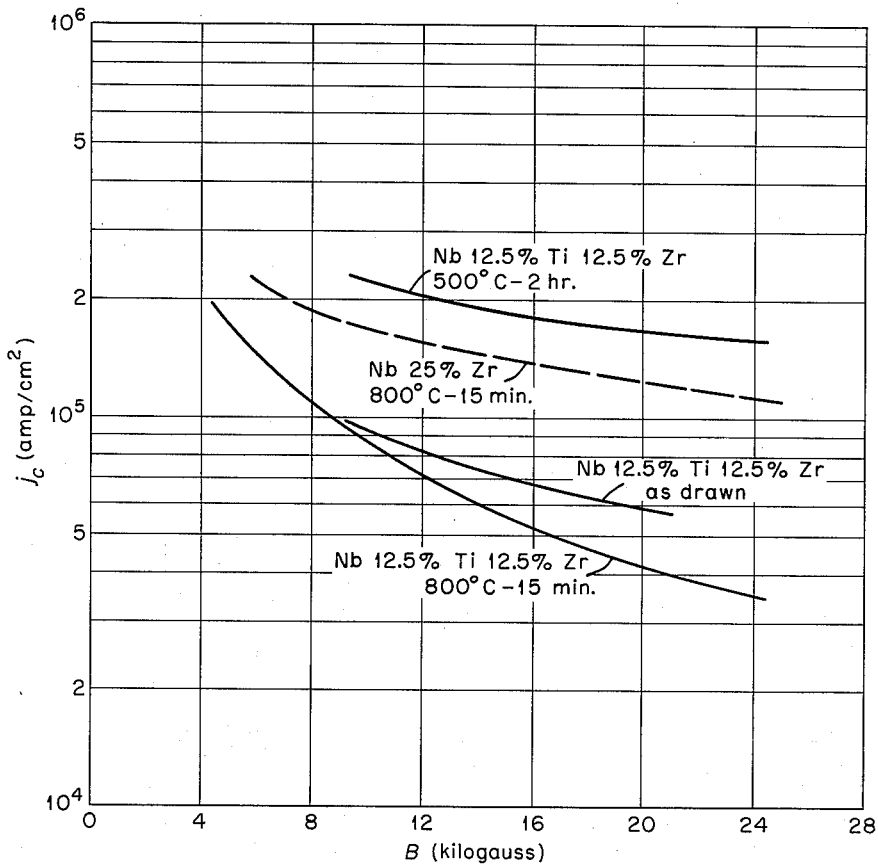
FIG. 6 is a plot showing the variation of critical current density as a function of magnetic field strength. Also shown is the variation of critical current density as a function of its metallurgical history as developed in accordance with this invention.

The foregoing example has illustrated, in detail, the means for effecting a marked increase in the superconducting current-carrying capacity of a binary alloy. However, this invention is not limited to binary alloys. The same advantages can be realized with alloys comprising three or more metals combined to form a superconducting alloy. The curves of FIG. 6 illustrate a case where the method of this invention can be used to enhance the superconducting current capacity of a ternary alloy, in the case illustrated— a niobium-base alloy containing 12.5 atomic percent titanium and 12.5 atomic perecent zirconium. The 'as drawn" wire represents non-precipitated material. When a precipitated phase was induced by annealing at 800° C. for 15 minutes, the resulting alloy wire had a critical current density somewhat less than the non-precipitated "as drawn" wire. However, when an "as drawn" wire was annealed at 500° C. for two hours and rapidly cooled, the critical current density of the resulting wire was found to have been significantly improved over the approximate range 10 to 25 kilogauss. For purposes of comparison, the critical density curve for a niobium-base alloy containing 25% zirconium over the same applied magnetic field is included in FIG. 6.

While we have described our invention in connection with improving critical current and critical current density of alloys in wire form, it should be understood that the method can be practiced with alloy specimens in other forms. For example, the critical current and hence the current-carrying capacity of superconducting alloy specimens in rod or sheet form will also be considerably improved by the process of precipitation within a two-phase or multiphase region existing below an essentially homogeneous solid solution phase as shown by the equilibrium phase diagram of the selected alloy. Nor is this invention limited to annealing to induce precipitation within any one multiphase region. The best two-phase or multiphase region will depend on the particular superconducting alloy to be treated and on the time at annealing temperature required to achieve maximum improvement in the critical current density. Such dependency will be readily determined by those skilled in the art, in the light of the preceding description.

Having thus described our invention, we claim:

1. A method of increasing the critical current of a hard superconducting alloy which comprises annealing said alloy within a multiphase region of its equilibrium phase diagram below a substantially homogeneous solid phase for a period of time sufficient to induce precipitation of a secondary phase, quenching said annealed alloy to retain said secondary phase, and subjecting said alloy to a magnetic field below its critical magnetic field at or below its critical temperature.

2. The method according to claim 14 wherein the alloy is a superconducting niobium-zirconium alloy.

3. The method according to claim 14, wherein the alloy is niobium-base alloy containing from 25–33 atomic percent zirconium.

4. A method of increasing the critical current of a hard superconducting alloy by the steps which comprise heating said alloy to form a homogeneous solid phase, annealing said heated alloy in a secondary phase region below said homogeneous phase, as displayed by an equilibrium phase diagram of said alloy, for a period of time sufficient to induce precipitation of a secondary phase, quenching said annealed alloy to retain said secondary phase, and then subjecting said quenched alloy to a magnetic field below its critical magnetic field at a temperature below its critical temperature.

5. The method of claim 4, wherein the alloy is selected from a metal of Groups IVA, VA and VIA of the Periodic Table and at least one metal selected from Groups III, IV, V, VI, VII and VIII of the Periodic Table.

6. The method according to claim 4, wherein the alloy is a superconducting niobium-zironium alloy.

7. The method according to claim 4, wherein the alloy is a niobium-base alloy containing 25–33 atomic percent zirconium.

8. A method of increasing the critical current density of a hard superconducting alloy which comprises annealing a substantially homogeneous solid solution of said alloy within a region below its said solution phase as displayed by an equilibrium phase diagram of said alloy, for a period of time sufficient to induce precipitation of a secondary phase, quenching said annealed alloy to retain said secondary phase, and then cold-working said quenched alloy to at least rod size.

9. A method of increasing the critical current density of a hard superconducting alloy which comprises annealing a substantially homogeneous solid solution of said alloy within a region below said solution, as displayed by an equilibrium phase diagram of said alloy, for a period of time sufficient to induce precipitation of a secondary phase, quenching said annealed alloy to retain said secondary phase, cold-working said quenched alloy to at least rod size, and then subjecting the resultant cold-worked alloy to a magnetic field below its critical magnetic field and below its critical temperature.

10. A method of increasing the critical current density of a superconducting niobium-zirconium alloy having a $\beta Zr$-$\beta Nb$ metallurgical phase structure as displayed by the equilibrium phase diagram of said alloy by the steps which comprise annealing said alloy within the region and compositional limits which display such phase structure for a period of time sufficient to induce precipitation of a secondary phase, quenching said annealed alloy to retain said secondary phase, and then subjecting said alloy to a magnetic field below its critical magnetic field and below its critical temperature.

11. The method according to claim 10, wherein the alloy to be treated is a niobium-base alloy containing from 25–33 weight percent zirconium and wherein the metallurgical structure of said alloy to be treated is a substantially homogeneous solid solution and wherein said alloy is annealed at 800° C. to induce precipitation.

12. A method of increasing the critical current density of a superconducting niobium-zirconium alloy having a $\alpha Zr$-$\beta Nb$ metallurgical phase structure, as displayed by the equilibrium phase diagram of said alloy, by the steps which comprise annealing said alloy within the region and compositional limits which display such equilibrium structure for a period of time sufficient to induce precipitation of a secondary phase, quenching said annealed alloy to retain said secondary phase, and then subjecting said alloy to a magnetic field below its critical magnetic field and below its critical temperature.

13. The method according to claim 10, wherein the resultant alloy is subsequently cold-worked to induce cold-working defects therein.

14. A method of increasing the critical current of a hard superconducting alloy which comprises annealing an alloy selected from a metal of Groups IVA, VA and VIA and at least one metal selected from Groups VI, VII and VIII of the Periodic Table within a multiphase region of its equilibrium phase diagram below a substantially homogenous solid phase for a period of time sufficient to induce precipitation of a secondary phase, quenching said annealed alloy to retain said secondary phase, and subjecting said alloy to a magnetic field below its critical magnetic field at or below its critical temperature.

15. The improved hard superconducting alloy resulting from the process of claim 1.

16. The improved hard superconducting alloy resulting from the process of claim 1 wherein said alloy is selected from a metal of Groups IVA, VA, and VIA of the Periodic Table and at least one metal selected from Groups III, IV, V, VI, VII and VIII of the Periodic Table.

References Cited by the Examiner

Chemical and Engineering News, June 19, 1961, p. 49, Feb. 20, 1961, p. 41; Jan. 19, 1962, p. 43; and Jan. 22, 1962, p. 89.

Rogers, et al.: Journal of Metals, September 1955, pp. 1034–1041.

DAVID L. RECK, *Primary Examiner.*

RAY K. WINDHAM, *Examiner.*